United States Patent [19]

Mattelon et al.

[11] Patent Number: 4,502,666
[45] Date of Patent: Mar. 5, 1985

[54] HAULAGE MACHINE FOR HAULING AN ELONGATE CYLINDRICAL UNIT

[75] Inventors: Jean-Claude Mattelon, Lyon; Albert Chauzu, Meyzieu, both of France

[73] Assignee: Les Cables De Lyon, Clichy, France

[21] Appl. No.: 477,713

[22] Filed: Mar. 22, 1983

[30] Foreign Application Priority Data

Mar. 23, 1982 [FR] France ................................ 82 04882

[51] Int. Cl.³ .......................................... B65H 59/00
[52] U.S. Cl. .......................................... 254/134.3 FT
[58] Field of Search ............... 254/134.3 FT, 134.3 R, 254/270, 287

[56] References Cited

U.S. PATENT DOCUMENTS

| | | | |
|---|---|---|---|
| 2,664,372 | 12/1953 | Hollingsworth | 254/134.3 R |
| 2,670,926 | 3/1954 | Sewell et al. | 254/287 |
| 3,653,636 | 4/1972 | Burrell | 254/270 |
| 3,774,827 | 11/1973 | Graybeal | 254/134.3 FT |
| 3,917,230 | 11/1975 | Barron | 254/270 |
| 3,961,772 | 6/1976 | Sweeney | 254/270 |

FOREIGN PATENT DOCUMENTS

| | | | |
|---|---|---|---|
| 46-38750 | 11/1971 | Japan | 254/134.3 R |
| 2037693 | 7/1980 | United Kingdom | 254/134.3 R |

Primary Examiner—Robert C. Watson
Attorney, Agent, or Firm—Sughrue, Mion, Zinn, Macpeak & Seas

[57] ABSTRACT

The invention relates to a haulage machine for hauling an elongate cylindrical unit (e.g. a cable) along a conduit or duct (3), said machine having a winch (11) on which a haulage rope (9) is wound, said haulage rope being hitched to the cylindrical unit (7) by a haulage head (8); one or more independant auxiliary haulage devices (1) are disposed at points (2) of access to the duct, each auxiliary device having drive rollers (6, 6'). The haulage head (8) is connected to signal to a regulator device (15) (e.g. via conductor wires contained in the haulage rope (9)), to indicate the haulage force it is applying and each auxiliary haulage device (1) has a variable discharge rate pump (4) which controls a hydraulic motor (5) whose output shaft rotates the drive rollers via clutches.

3 Claims, 4 Drawing Figures

HAULAGE MACHINE FOR HAULING AN ELONGATE CYLINDRICAL UNIT

FIELD OF THE INVENTION

The present invention provides a haulage machine for hauling an elongate cylindrical unit inside a duct, said machine having a winch on which a haulage rope is wound, said haulage rope being hitched to the cylindrical unit by haulage head, one or more independent auxiliary haulage devices are disposed at points of access to the duct, each auxiliary device having drive rollers.

BACKGROUND OF THE INVENTION

Very long cylindrical units, in particular lengths of telephone cables, are generally laid in position inside ducts by hauling one end of the unit by means of a rope hitched to a haulage device e.g. a winch or a capstan.

Said operation soon comes up against a main difficulty, namely the increase in the required haulage force to overcome friction between the hauled unit and the wall of a duct. Said haulage force can be greater than the breaking strength of the hauled unit.

For example, a currently made optical fibre cable cannot withstand a traction force of more than 130 kilograms weight and for haulage distances of about 600 m, the force necessary to haul a cable is 2000 kilograms weight.

Of course, shorter lengths of cables could be hauled, but in that case, a large number of splices are required along the line and that would cause an attenuation in transmission and a larger number of points of access to the duct would also be necessary.

Document FR-A No. 2 450 775 describes an installation which uses auxiliary devices disposed at points of access to a duct and which are driven by an electric motor and synchronized by a control panel connected to each of the devices by an electric cable thereby limiting the use of the auxiliary devices to short distances.

A unit can be driven along by rollers, caterpillar tracks or tyre-mounted wheels as described in document FR-A No. 2 259 460.

Preferred embodiments of the present invention make each auxiliary device placed along a duct independant and self-adjusting.

For cables, said auxiliary devices are generally placed at the existing bends in each duct, since said ducts rarely have rectilinear portions of great length.

Preferred embodiments of the invention also improve the accuracy of measurement of the traction force since in conventional haulage devices, the traction force is measured on the winch. This can give rise to errors of up to about 40%.

SUMMARY OF THE INVENTION

The present invention provides a haulage machine for hauling an elongate cylindrical unit inside a duct, said machine having a winch on which a haulage rope is wound, said haulage rope being hitched to the cylindrical unit by a haulage head, one or more independent auxiliary haulage devices are disposed at points of access to the duct, each auxiliary device having drive rollers, wherein the haulage head is connected to signal the haulage force it is applying to the elongate unit to a regulation system and wherein each auxiliary haulage device has a variable discharge rate pump and thereby controls a hydraulic motor whose output shaft rotates the drive rollers via clutches.

BRIEF DESCRIPTION OF THE DRAWINGS

A haulage machine for hauling a long elastic cylindrical unit is described hereinafter by way of example and with reference to the accompanying drawings, in which.

MORE DETAILED DESCRIPTION

Figure 1:
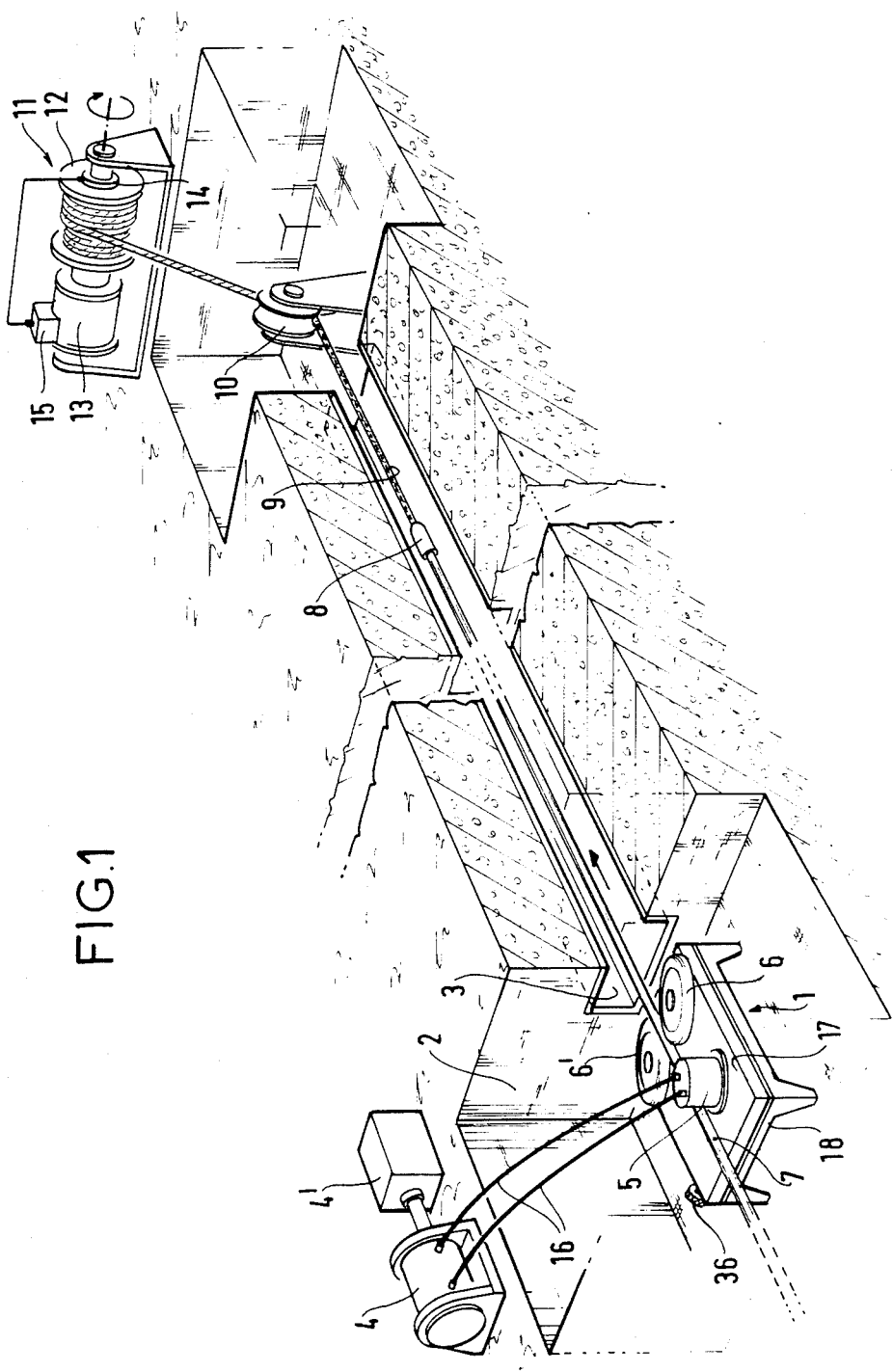
FIG. 1 is a partially cut-away perspective view illustrating a general haulage installation showing a single auxiliary haualge device.

In FIG. 1, an auxiliary haulage device 1 is set in place at an access point 2 to a duct 3. Said device has an upper plate 17 and a lower cover 18. A variable-discharge hydraulic pump 4 is driven by a motor 4' (e.g. a heat engine or an electric motor energized by an electric power unit) is connected by flexible pipes 16 to a hydraulic motor 5 which, via a mechanism described hereinafter, drives drive rollers 6, 6'. A cylindrical component 7 passes between the two drive rollers and is connected to a haulage head 8. A haulage rope 9 connected by one of its ends to the haulage head 8 passes over a pulley 10 to be wound onto the drum 12 of a winch 11. The winch also has a motor 13, a rotary contact 14 located on the shaft of the drum and an electronic regulation system 15.

Figure 2:
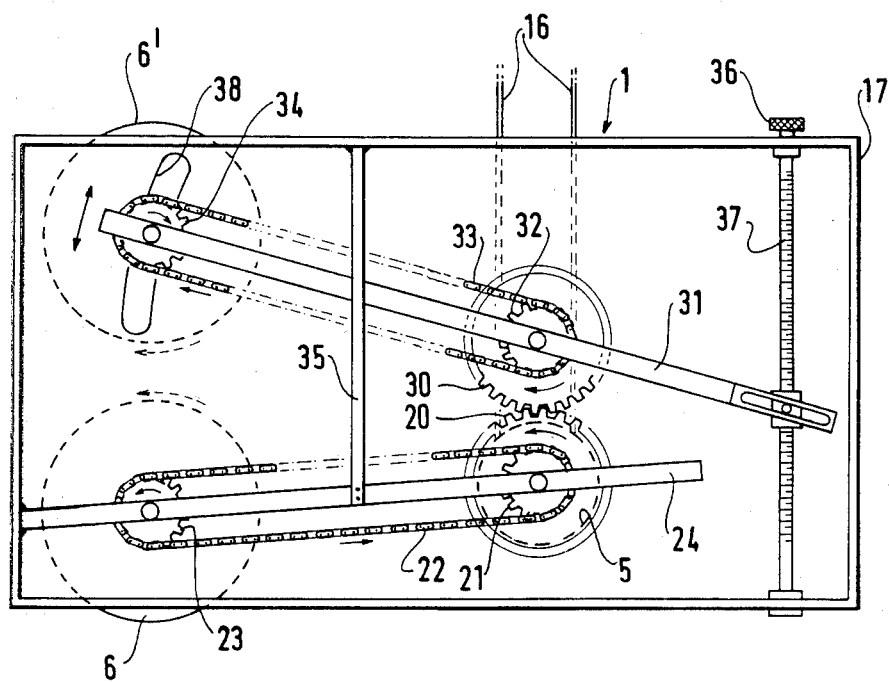
FIG. 2 is a view of the transmission system in a haulage device in accordance with the invention as seen from below and with a lower cover removed.

In FIG. 2, the haulage device 1 is seen from below, the lower cover 18 being removed. The hydraulic motor which receives an operating fluid via the pipes 16 is located on the same shaft as a gear 20 and as a cog 21 which, via a chain 22, drives another cog 23 which is itself located on the shaft 40 of the driver roller 6. This defines a first transmission mounted to a fixed bar 24. The gear 20 drives an identical gear 30 located at the axis of rotation of a bar 31 to which it is mounted. By means of a chain 33 a cog 32 drives another cog 34 located on the shaft of the drive roller 6'.

A further bar 35 supports the bar 31 to prevent it from sagging too much. The bar 31 is pivoted by a knurled knob 36 installed at the end of a threaded bar 37 and serves to adjust the tightening pressure applied to the cylindrical unit by the two rollers 6, 6'. The shaft for roller 6' moves in a slot 38.

Figure 3:
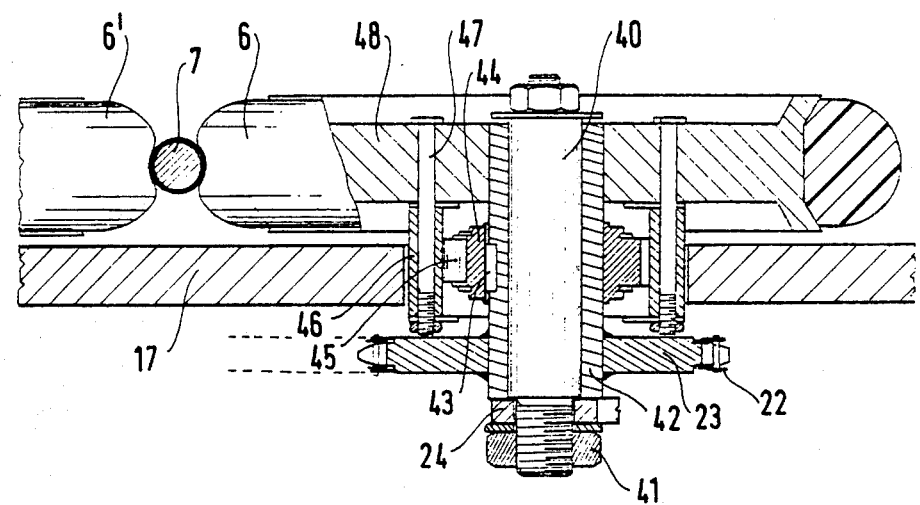
FIG. 3 a partial section through a cylindrical unit as held between two rollers, showing the mechanical assembly of a roller with its clutch which, in the present case, is of the idler wheel type.

In FIG. 3, the cylindrical unit 7 can be seen passing between the two drive rollers 6, 6'. The shaft 40 of the roller 6 is fixed on the plate 24 by a bolt 41. The chain 22 drives the cog 23 which is fast with a ring 42. A pin 43 ensures the rotation of an inner cage 44 of the idler wheel which wheel also has rollers 45 and an outer cage 46 made integral with the flange 48 of the roller 6 by means of bolts 47.

Figure 4:
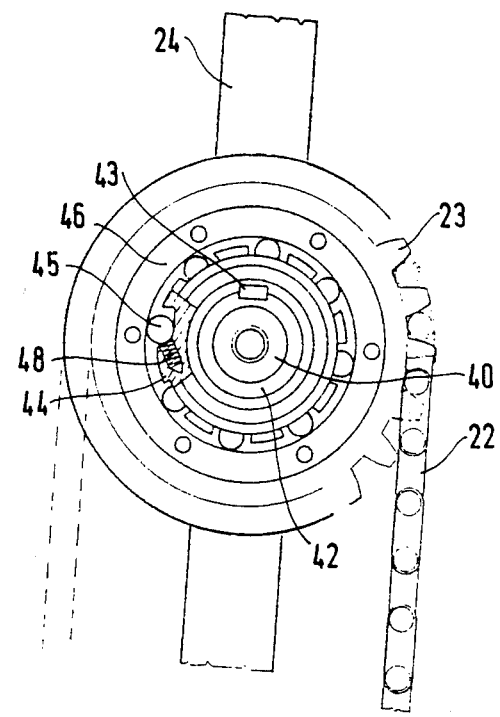
FIG. 4 is a plan view of an idler wheel and a drive chain as shown in FIG. 3 and seen from above, with the roller and the upper plate removed.

In FIG. 4, a partial cross-section of the idler wheel shows that the rollers 45 are biased by springs 48.

The machine in accordance with the invention operates as follows:

At the beginning of haulage, little force is necessary to haul the unit since there is little friction. The winch therefore drives the cylindrical unit at high speed.

Said speed is however controlled since beyond a given limit, the traction force on the cylindrical unit can become too great. The haulage head 8 therefore has a sensor which delivers a signal to the electronic regulation system 15 via conductor wires which pass along the inside of the haulage rope 9 and via the rotating contact 14 placed on the drum 12 of the winch 11. The electronic regulation system limits the rotation speed of the drum 12 and therefore the travel speed. Installing the sensor in the haulage head makes it possible to limit the danger of errors when measuring the haulage force.

The pressure in each variable flow rate pump 4 is adjusted in advance to drive the output shaft of each hydraulic motor at a constant speed. Therefore, the rollers 6, 6' are driven by the cylindrical unit and uncoupled from the drive shaft which rotates more slowly by means of the idler wheel. As haulage progresses the friction between the unit and the duct increases, the travel speed decreases and the roller rotation speed decreases until it becomes equal to the rotation speed of the drive shafts of each auxiliary device. At this moment the auxiliary devices come into action and distribute the haulage force along the entire hauled unit.

Further, the pressure in each variable discharge rate pump 4 is adjusted in advance to stop the action of each auxiliary device 1 in the case of the winch stopping. Indeed, to avoid any danger of damage or of cobbling the unit in the duct, in the case of a stoppage of the winch the drive force on the rollers must be insufficient to advance the unit. The very principle of the hydraulic motor 5 prevents overheating which would occur in an electric motor.

Without going beyond the scope of the invention, the rollers 6, 6' can be equipped with a clutch other than an idler wheel and data can be transmitted between the sensor placed in the haulage head and the electronic regulation system by radio waves, the sensor then requiring a transmitter and an electric supply system.

We claim:

1. In combination, a haulage machine for hauling an elongate cylindrical unit inside a duct, said machine including:
   a winch on which a haulage rope is wound, said haulage rope being hitched to the elongate cylindrical unit by a haulage head,
   a regulation system at said winch for controlling winch operation,
   one or more independent auxiliary haulage devices being disposed at points of access to the duct, each auxiliary device having drive rollers,
   said haulage head having a sensor connected to said regulation system to signal the regulation system the haulage force it is applying to the elongate cylndrical unit,
   and each auxiliary haulage device having a variable discharge rate pump controlling a hydraulic motor whose output shaft rotates the drive rollers via clutches.

2. A haulage machine according to claim 1, further including means for adjusting the pressure in each variable discharge rate pump in advance to drive the output shaft of each hydraulic motor at a constant speed.

3. A haulage machine according to claim 1, further including means for adjusting the pressure in each variable discharge rate pump in advance to stop the action of each auxiliary device in the case of stoppage of the winch.

* * * * *